UNITED STATES PATENT OFFICE.

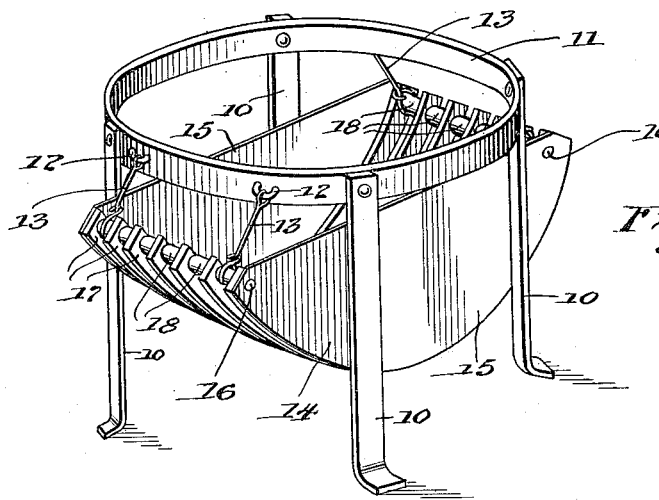
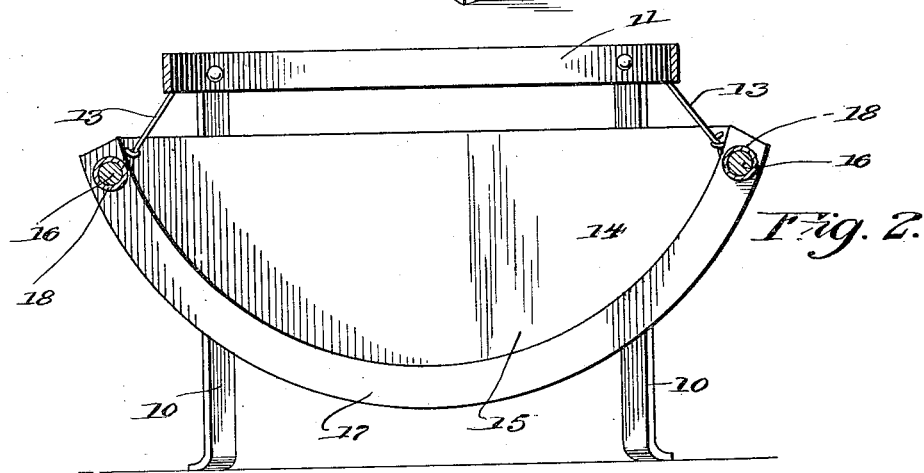
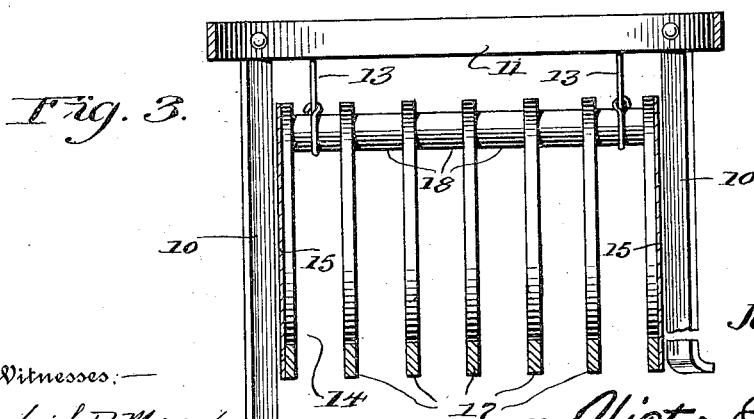

JOHN T. MORGAN, OF BURLISON, TENNESSEE.

POT-HOLDER.

1,139,212.

Specification of Letters Patent.

Patented May 11, 1915.

Application filed April 10, 1914. Serial No. 831,080.

*To all whom it may concern:*

Be it known that I, JOHN T. MORGAN, a citizen of the United States, residing at Burlison, in the county of Tipton and State of Tennessee, have invented new and useful Improvements in Pot-Holders, of which the following is a specification.

An object of the invention is to provide a device which is adapted to be used in connection with open fires or fire places for holding pots or other receptacles in position so that the contents thereof will be properly cooked or subjected to the heat of the flame.

The invention contemplates, among other features, the provision of a pot holder which is particularly adapted for use in connection with open outdoor fires or in fire places, although the same can also be used on stoves, and the invention comprehends a means for suitably supporting the pot or other receptacle, with other means around or beneath which the fire can be built or which can be used with a coal fire.

In the further disclosure of the invention reference is to be had to the accompanying drawings, constituting a part of this specification, in which similar characters of reference denote corresponding parts in all the views, and in which:

Figure 1 is a perspective view of the pot holder; Fig. 2 is a vertical longitudinal sectional view; and Fig. 3 is a vertical transverse sectional view.

Referring more particularly to the views, I provide a plurality of legs 10 carrying a horizontally arranged circular band 11 at their upper ends, the said band being rigidly secured to the legs so that it will be supported in a horizontal plane. The band on its exterior face has a series of eyelets 12 into which are adapted to removably extend the upper ends of the hooks 13 which have their lower ends suitably connected to a member 14 to dependingly support the same beneath the band 11.

The member 14 is substantially cradle shaped and consists of a plurality of side plates 15 connected by horizontal rods 16, with a series of segmental grate bars 17 supported on the rods 16 and relatively spaced apart by substantially circular spacing members 18 encircling the rods 16, as shown.

With a structure of the character described it will be apparent that the device can be so arranged over an open fire that when a pot is supported on the band 11 the same will be in close proximity to the flames and over the heat produced by the flames. Ordinarily, with open fires, bricks or other iron structures, such as swinging cranes or the like, are generally used to support the pots or other receptacles over the fires. With this construction the part supporting the pot will be rigid and stationary with respect to the ground or plate upon which the fire is built and by having the member 14 provided with grate bars 17 the fire can be built around the member or beneath the same so that flames can reach the under side of the pot supported on the band. If desirable, particularly in connection with coal fires, the coals can be arranged to lie within the member 14 and repose upon the grate bars 17 so that when coals are burnt they will supply an intense heat which, being immediately under the pot supported on the band, will cook the contents thereof.

From the foregoing description it will be seen that the device described is of a simple construction, consists of few parts and can be cheaply manufactured to perform the desired result.

Having thus described my invention, I claim:

In combination with a supporting body, a band, a segmentally shaped grate member consisting of side plates and interposed segmentally shaped relatively spaced grate bars, eyes on the band, and hooks carried by the eyes and connecting with the grate member to swingingly support the same on the supporting body.

In testimony whereof I affix my signature in presence of two witnesses.

JOHN T. MORGAN.

Witnesses:
E. M. TEMPLETON,
O. C. GROVES.

Copies of this patent may be obtained for five cents each, by addressing the "Commissioner of Patents, Washington, D. C."